United States Patent
David et al.

(10) Patent No.: US 12,313,153 B1
(45) Date of Patent: May 27, 2025

(54) PLANETARY PINION INPUT ELECTRIC DRIVE UNIT

(71) Applicant: Dana Heavy Vehicle Systems Group, LLC, Maumee, OH (US)

(72) Inventors: Jeffrey M. David, Cedar Park, TX (US); William F. Waltz, Toledo, OH (US)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 0 days.

(21) Appl. No.: 18/410,590

(22) Filed: Jan. 11, 2024

(51) Int. Cl.
| | |
|---|---|
| *B60K 1/02* | (2006.01) |
| *B60L 15/00* | (2006.01) |
| *F16H 3/72* | (2006.01) |
| *F16H 48/11* | (2012.01) |
| *F16H 61/66* | (2006.01) |
| *F16H 63/50* | (2006.01) |

(52) U.S. Cl.
CPC ............... *F16H 48/11* (2013.01); *B60K 1/02* (2013.01); *B60L 15/007* (2013.01); *F16H 3/72* (2013.01); *B60L 2240/421* (2013.01); *F16H 2061/6602* (2013.01); *F16H 63/50* (2013.01)

(58) Field of Classification Search
CPC .... F16H 3/72; F16H 2061/6602; F16H 3/727; F16H 63/50; F16H 2003/447; F16H 9/26; F16H 84/11; B60L 15/2045; B60L 15/007; B60L 2240/421; B60K 1/02; B60K 17/16; B60K 17/348
USPC ................. 475/153, 150, 332, 338; 74/665 F, 74/665 G, 665 GA, 665 L, 665 N
See application file for complete search history.

(56) References Cited

U.S. PATENT DOCUMENTS

| | | | |
|---|---|---|---|
| 6,118,194 A | * 9/2000 | Kawamura | H02K 7/1815 310/74 |
| RE41,034 E | 12/2009 | Lilley et al. | |
| 8,228,008 B2 | 7/2012 | Kitanaka | |
| 9,487,084 B2 | 11/2016 | Petersen et al. | |
| 11,306,802 B2 | 4/2022 | David et al. | |
| 11,313,440 B2 * | 4/2022 | Harvey | F02C 7/36 |
| 2003/0176955 A1* | 9/2003 | Minagawa | B60W 10/06 903/910 |

(Continued)

OTHER PUBLICATIONS

Lowenthal, S. et al., "Evaluation of a High Performance, Fixed-Ratio, Traction Drive," NASA Technical Memorandum 81425, NASA Website, Available Online at https://ntrs.nasa.gov/api/citations/19830011864/downloads/19830011864.pdf, 1980, 13 pages.

(Continued)

*Primary Examiner* — Roger L Pang
(74) *Attorney, Agent, or Firm* — McCoy Russell LLP

(57) ABSTRACT

Methods and systems for an electric drive unit. The electric drive system includes, in one example, a set of electric machines each of which are rotationally coupled to a pinion device in a set of pinion devices and a planetary assembly. The electric drive system further includes an inverter assembly electrically coupled to the set of electric machines in parallel. The planetary assembly includes the set of pinion devices, a carrier which is mechanically grounded, a ring device, and a sun device, where the ring device and/or the sun device are rotationally coupled to the set of pinion devices.

17 Claims, 8 Drawing Sheets

(56) References Cited

U.S. PATENT DOCUMENTS

| | | | | |
|---|---|---|---|---|
| 2007/0087885 | A1* | 4/2007 | Rosemeier | F16H 48/11 |
| | | | | 475/5 |
| 2015/0053173 | A1* | 2/2015 | Young | B60L 1/003 |
| | | | | 123/339.24 |
| 2016/0368363 | A1* | 12/2016 | Petersen | B60K 6/26 |
| 2017/0166184 | A1* | 6/2017 | Tokura | B60L 15/2054 |
| 2023/0054823 | A1 | 2/2023 | David | |
| 2023/0287965 | A1* | 9/2023 | Long | B60K 6/46 |

OTHER PUBLICATIONS

Benford, B. et al., "The Lever Analogy: A New Tool in Transmission Analysis," SAE Technical Paper 810102, Feb. 1, 1981, 12 pages.
Budynas, R. et al., "Shigley's Mechanical Engineering Design," 9th Edition, McGraw Hill, New York, New York, 2010, 1109 pages.

\* cited by examiner

PLANETARY PINION INPUT ELECTRIC DRIVE UNIT

TECHNICAL FIELD

The present description relates generally to an electric drive unit with multiple electric machines that each drive a pinion device in a planetary assembly.

BACKGROUND AND SUMMARY

Electric drives have been utilized in certain vehicles as the transportation sector moves toward powertrain electrification. Some electric drives use planetary gear sets which are driven by a single comparatively large traction motor. Large traction motors exhibit increased complexity and are more expensive to manufacture than smaller motors, in some cases. Further, in planetary gear sets where the sun gear is used as the input for the gear set, and in particular planetary gear sets with relatively high ratios, the sun gear carries high input torque from the electric motor during certain operating conditions. Sun input planetary gear sets may also experience noise, vibration, and harshness (NVH) as well as manufacturing issues, in some instances.

U.S. Pat. No. 9,487,084 B2 to Petersen et al. shows an electric drive with multiple motors which provide parallel input to a Ravigneaux gear set. The Ravigneaux gear set includes summing sun gears which are coupled to summing differential planet gears.

The inventors have recognized several issues with Petersen's multi-motor electric drive. For instance, Petersen's Ravigneaux gear set is complex and may be difficult to manufacture. Further, Petersen is silent with regard to any sort of system used for electrical power delivery to the motors. Further, the inventors have recognized that other electric drive systems which have made use of two motors and inverters present manufacturing and cost challenges when compared to electric drive systems which solely use one motor and one inverter in the electric drive.

The inventors have recognized the aforementioned challenges and developed an electric drive unit to at least partially overcome the challenges. The electric drive system includes, in one example, a set of electric machines each of which are rotationally coupled to a pinion device in a first set of pinion devices. The electric drive system further includes a planetary assembly with the first set of pinion devices, a carrier which is mechanically grounded, a ring device, and a sun device. In the planetary assembly, the sun device and/or the ring device are rotationally coupled to the first set of pinion devices. The electric drive system additionally includes an inverter assembly electrically coupled to the first set of electric machines in parallel. In this way, electrical energy is efficiently delivered to multiple electric machines in the drive unit. Further, the use of multiple electric machines, as opposed to a single machine, allows for manufacturing expense reductions to be achieved via economies of scale.

In one example, the electric drive unit may further include a second set of electric machines each of which are rotationally coupled to a pinion device in a second set of pinion devices. In this example, the planetary assembly includes the second set of pinion devices and the second set of pinion devices are rotationally coupled to the sun device and/or the ring device. In such an example, the first and second sets of pinion device may have asymmetric ratios. In this way, the electric drive unit is able to achieve enhanced performance. For instance, both sets of electric machines may be used for high torque operation, or the set of electric machines coupled to the lower ratio pinion devices may be used for comparatively light load operation while the other electric machine group is shut-down, thereby increasing drive unit efficiency.

Further, in one example, the inverter assembly may further include a first set of electrical contacts that independently selectively electrically decouple the inverter assembly from the first set of electric machines. The electric drive unit further includes a second set of electrical contacts that independently selectively electrically decouple the inverter assembly from the second set of electric machines. In this way, load sharing functionality at less than peak load can be implemented, if desired.

In another example, the inverter assembly further includes a first sub-assembly that independently electrically drives the first set of electric machines and a second sub-assembly that independently electrically drives the second set of electric machines. In this way, one inverter is subdivided into two sections to again allow for load sharing at less than peak load to be carried out.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Electric drive units and systems are described herein which achieves increased performance and manufacturing expense savings due to economies of scale. To achieve this increase performance and manufacturing gains, multiple motors which are each coupled to a pinion gear, or a planet roller in a traction drive planetary, are incorporated into the drive unit. Further, using multiple pinions, each of which receive input from a separate motor, allows the input torque load to be shared among a larger number of components, thereby decreasing the chance of drive unit degradation and increasing drive unit longevity.

Figure 1A:
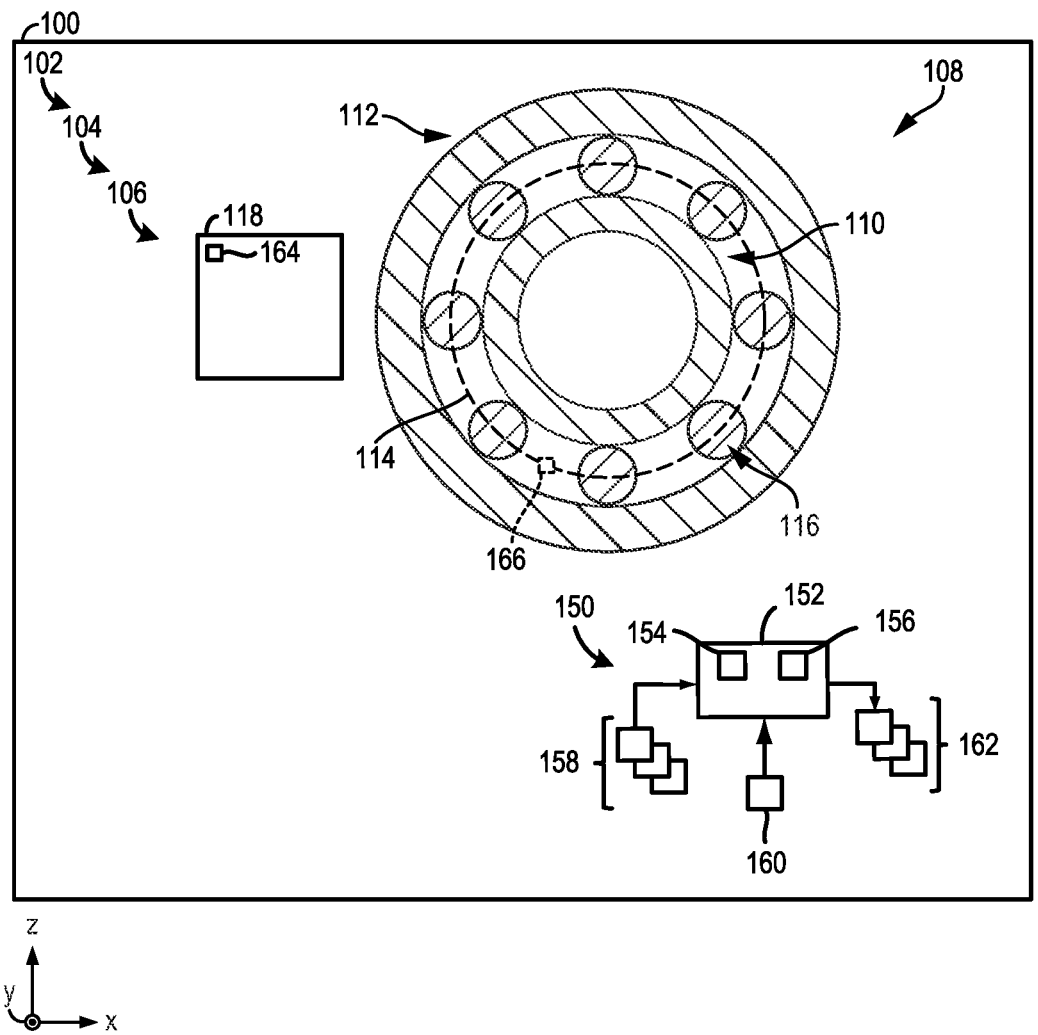
FIG. 1A is an illustration of an electric vehicle (EV) with an exemplary electric drive unit that includes a planetary assembly.

FIG. 1A shows an electric vehicle (EV) 100 with a powertrain 102 that includes an electric drive system 104 with an electric drive unit 106. The EV 100 may be an all-electric vehicle (e.g., battery electric vehicle (BEV)), in one example, or a hybrid electric vehicle, in another example. As such, vehicles that utilize the electric drive units described herein may also have an internal combustion engine (e.g., a spark ignition engine, a compression ignition engine, combinations thereof, and the like), in some examples. Thus, the electric drive units described herein may be used in cars, trucks, boats, ATVs, commercial vehicles, light vehicles, off-highway vehicle, mining vehicles, rail vehicles, manufacturing machinery, industrial machinery, and the like.

In the illustrated example, the electric drive unit 106 includes a simple planetary assembly 108 with a sun device 110, a ring device 112, a carrier 114 which is mechanically grounded, and a set of pinion devices 116 which are coupled to the carrier. As described herein a simple planetary assembly is an assembly that solely includes a sun device, a ring device, a carrier, and multiple pinion devices. Alternatively, as elaborated upon herein, a compound planetary assembly may be used in the drive units described herein.

The pinion devices 116 are rotationally coupled to the ring device 112 and the sun device 110 such that torque is transferred therebetween. The pinion devices may also be referred to as planet devices. The carrier 114 is mechanically grounded in the illustrated example. The ring device 112 and/or the sun device 110 function as the planetary assembly's output as described in greater detail herein. Conversely, the set of pinion devices 116 function as the planetary assembly's input. In one example, the sun device 110 may be hollow to allow for pass through of a connecting powertrain shaft to additional downstream gearing.

In one use-case example, the pinion devices 116 may be constrained to a maximum relative speed between 10,000 revolutions per minute (RPM) and 12,000 RPM when there is no dedicated lubrication for the bearing (e.g., needle roller bearing) which are coupled to the pinion devices. The relative speed of the pinion devices refers to the relative speed between the pinion devices and the carrier which is grounded. However, it will be understood that alternate suitable control schemes may be used for electric machines (discussed in greater detail herein) which may have different speed constraints. Factors which may affect the speed constraints includes the type and size of electric machines utilized in the drive unit, the type and size of the machine cooling systems which are deployed in the drive unit, motor rotor and pinion bearing speed limitations, and the like.

A set of electric machines 118 (e.g., traction motors) with multiple electric machines are included in the electric drive unit 106. Each of the electric machines in the set of electric machines 118 are coupled to a separate pinion device in the set of pinion devices 116. The electric machines 118 are schematically depicted in FIG. 1A. However, it will be understood that the machines may have greater complexity with regard to form factor, for instance. Motor packaging in relation to motor form factor is discussed in more detail below with regard to FIG. 2A.

The electric machines described herein may be, but are not limited to, multi-phase (e.g., three-phase, four-phase, six-phase, etc.) alternating current (AC) machines. Further, the electric machines described herein may be configured to operate in a drive mode as well as a regeneration mode, in some cases. In the regeneration mode, the machine generates electrical energy. In particular, in some examples, the electric machine described herein may be induction motors, also referred to as asynchronous motors. In other examples, the electric machines describe herein may be permanent magnet (PM) motors (e.g., PM synchronous motors) which include permanent magnets incorporated therein. The specific types of motors used in the electric drive unit may be selected based on the inverter architecture in the drive unit which is expanded upon below with regard to FIGS. 5A-5C.

Figure 2A:
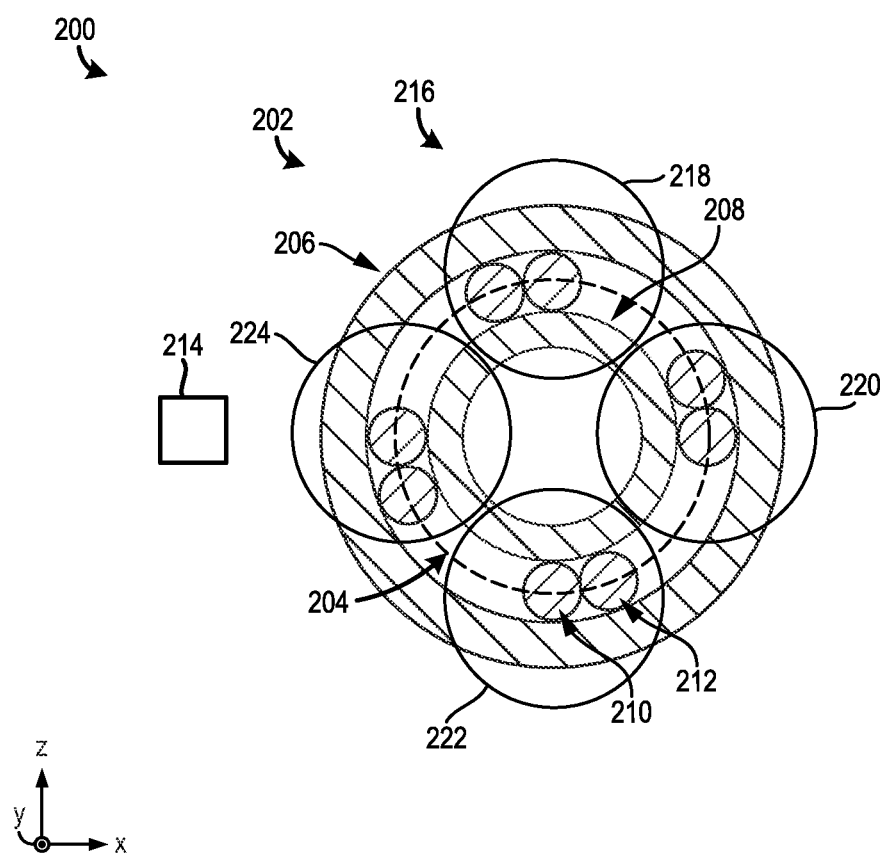
FIG. 2A is an illustration of another exemplary electric drive unit with a compound planetary gear set.

As indicated above, the set of electric machines 118 are schematically depicted in FIG. 1A. However, it will be understood that each of the machines may be positioned coaxial to the pinion device to which it is attached as shown in FIG. 2A and discussed in greater detail herein.

The planetary assemblies described herein may be planetary gear sets or traction drive planetary devices. The planetary assemblies and the components therein are described below as planetary gear sets with gears. However, it will be understood that traction drives with an identical layout to the planetary gear sets may be used in any of the electric drive units described herein.

As shown in FIG. 1A, the EV 100 may further include a control system 150 with a controller 152. The controller 152 may include a microcomputer with components such as a processor 154 (e.g., a microprocessor unit), input/output ports, an electronic storage medium 156 for executable programs and calibration values, e.g., a read-only memory chip, random access memory, keep alive memory, a data bus, and the like. The storage medium may be programmed with computer readable data representing instructions which are executable by a processor for performing the methods, control techniques, and the like described herein as well as other variants that are anticipated but not specifically listed. Therefore, the electronic storage medium 156 may hold instructions stored therein that when executed by the processor 154 cause the controller 152 to perform the various method steps described herein.

The controller 152 may receive various signals from sensors 158 coupled to different regions of the EV 100 and specifically the electric drive unit 106. For example, the sensors 158 may include one or more motor speed sensors (elaborated upon below), shaft/gear speed sensors, a pedal position sensor to detect a depression of an operator-actuated pedal (e.g., an accelerator pedal and/or a brake pedal), speed sensors at the vehicle wheels, and the like. An input device 160 (e.g., accelerator pedal, brake pedal, gear selector, combinations thereof, and the like) may further provide input signals indicative of an operator's intent for vehicle control.

Upon receiving the signals from the various sensors 158 of FIG. 1A, the controller 152 processes the received signals, and employs various actuators 162 of vehicle components to adjust the components based on the received signals and instructions stored on the memory of controller 152. For example, the controller 152 may receive an accelerator pedal signal indicative of an operator request for a vehicle acceleration adjustment. In response, the controller 152 may command operation of inverters which are electrically coupled to the electric machines 118 to increase the power delivered from the motors to the planetary assembly 108. The other controllable components in the vehicle may function in a similar manner with regard to sensor signals, control commands, and actuator adjustment, for example. Further, the control system 150 may be used in any of the electric drive systems and units described herein.

A speed sensor 164 incorporated into the set of electric machines 118, may be used in the electric drive unit 106. To elaborate, for the multiple electric machines (e.g., either induction motors or PM motors) solely one speed sensor (which is coupled to one of the motors) may be used to determine motor speed, if wanted. The planetary gearing constrains the electric machines to rotate at the same speed.

When induction motors are used, induction motor control may solely demand motor speed and position information for an encoder. As such, the speed sensor may include an encoder in the induction motor example. On the other hand, in the case of PM motors, motor control may demand speed and absolute position information (alignment of d-axis to magnet poles) which may demand a resolver to be utilized for the speed sensor and a resolver offset learn (ROL) routine. For PM motors, the motors may be sorted into sets with similar ROL values. For PM motors assembly considerations, the motors may include a locating feature and a synchronization mark (schematically depicted at 166) on the carrier to enable all of the motor's d-axes are aligned to the single speed sensor. Alignment may be demanded during assembly of the planetary gear set's carrier. The alignment may be demanded for coordinated motor control and is independent of the number of speed sensors specified. Using a single speed sensor decreases the drive unit's complexity and cost, making the drive unit more attractive to customers. Alternatively, multiple speed sensors may be used in the electric drive unit.

The controller 152 may include a control routine which operates the electric drive system in a full torque control mode where an equivalent torque demand may be requested for all of the electric machines which are coupled to the set(s) of pinion devices. In this full torque control mode, the electric machine speed will result from the torque balance between the electric machines and the demanded torque.

Additionally, in one example, the controller 152 may include a control routine which operates the electric drive unit in a speed and torque control mode where the electric machine with the primary speed sensor is controlled with a speed signal and the other electric machines are controlled via torque signals. The speed and torque control mode may specifically be implemented in electric drive systems which utilize the inverter assemblies shown in FIGS. 5B and 5C and the corresponding electric machine and planetary assemblies.

Figure 3:
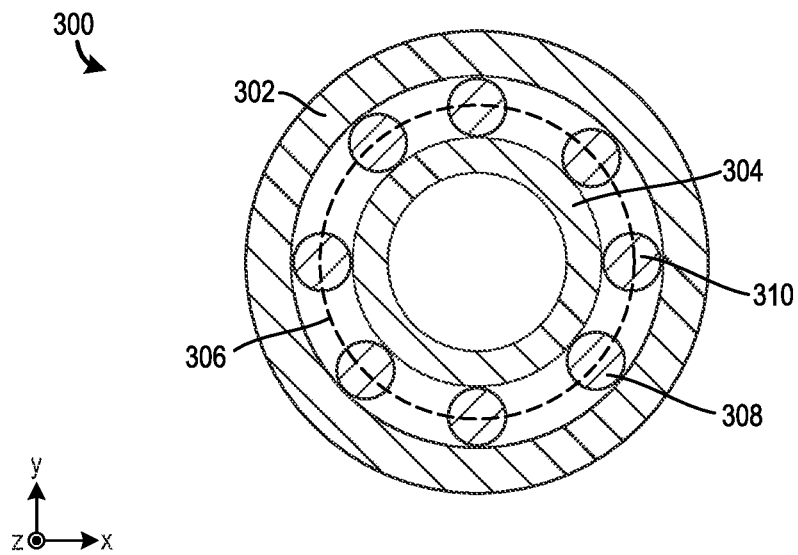
FIGS. 3-4 are illustrations of alternate planetary gear set architectures.
Figure 4:
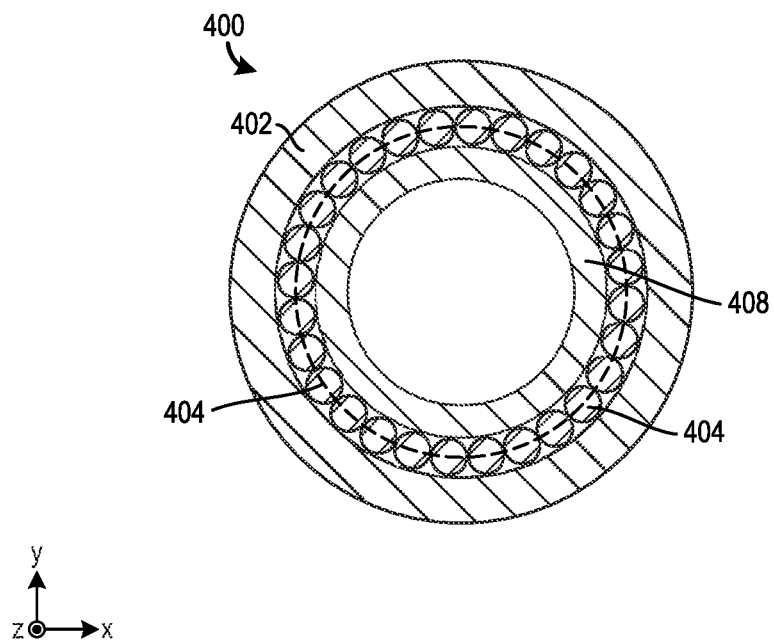

An axis system is provided in FIG. 1A, as well as FIGS. 2A and 3-4, for reference. The z-axis may be a vertical axis (e.g., parallel to a gravitational axis), the x-axis may be a lateral axis (e.g., horizontal axis), and the y-axis may be a longitudinal axis, in one example. However, in other examples, the axes may have other orientations.

Figure 1B:
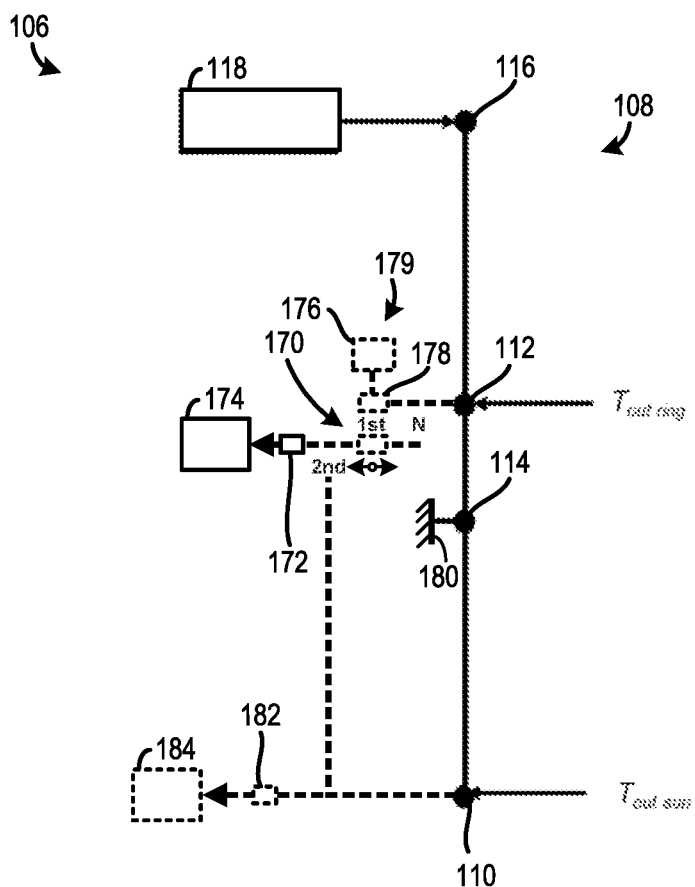
FIGS. 1B-1C are lever diagrams of the electric drive unit and the planetary assembly, depicted in FIG. 1A.

FIG. 1B shows a drive torque lever diagram for the electric drive unit 106 with the planetary assembly 108. In the lever diagram depicted in FIG. 1B as well as the other lever diagrams illustrated in the figures, the planetary assembly components are illustrated as nodes. The set of electric machines 118 is shown providing input to the set of pinion gears 116. The pinion gears 116 are rotationally coupled to the ring gear 112 which is rotationally coupled to the sun gear 110. Further, in the illustrated example, the carrier 114 is fixed and the ring gear 112 and the sun gear 110 are potential output locations. To elaborate, the carrier 114 may be grounded via a component 180 which may be a drive unit housing, in one example, or a front face of one of the electric machines, in another example. In this way, the carrier is mechanically grounded in a space efficient manner. Equations (1) and (2) which denote the correspondence between the planetary assembly's ring to planet ratio, the input torque, and the output torque when the ring gear and the sun gear are used as the planetary gear set's output, respectively, are provided below.

$$\frac{T_{outR}}{T_{in}} = e_P \quad (1)$$

$$\frac{T_{outS}}{T_{in}} = \frac{e_P}{e_1} \quad (2)$$

Parameters $T_{outR}$: Output Torque, ring $T_{outS}$: Output Torque, sun $e_{P1}$: ring to first pinion ratio $e_1$: ring to sun ratio FIG. 1B shows an optional clutch 170 (e.g., but not limited to a sliding clutch mechanism) which may be included in the electric drive unit 106. The clutch 170 is configured to selectively engage the ring gear 112 with an output 172 for the planetary gear set 108, in a first position, and the sun gear 110 with the output 172. As such, the clutch 170 is shiftable between a first gear positon where the ring gear is the output and a second gear position where the sun gear is the output. The clutch 170 may also have a neutral position where neither the ring gear nor the sun gear is engaged. A clutch as described herein may be a friction clutch (e.g., a wet friction clutch), a synchronizer, a dog clutch, combinations thereof, and the like.

The output 172 may take the form of a shaft, a gear, a chain, a flange, combinations thereof, and the like. The output 172 may be rotationally coupled to a downstream powertrain component 174. For instance, in one example, the output 172 may be coupled to a drive axle which may include a differential which provide mechanical power to drive wheels via axle shafts.

In another example, the downstream component 174 which is rotationally coupled to the output 172 may be a drive wheel. In such an example, two electric drive units (e.g., left and right electric drive units) may independently provide mechanical power to opposing drive wheels (e.g., left and right drive wheels). To elaborate, the two drive unit architecture may be designed to function as a torque vectoring e-axle where torque bias is created with unequal electric drive unit torque. In such an example, a differential may be omitted from the drive axle.

In another example, the downstream component 174 may be additional gearing or a gearbox (e.g., a multispeed gearbox). In such an example, a through shaft motor architecture may be avoided, if desired, with the combined motor inputs 118 and pinion input planetary assembly 108 allowing pass through of a connecting shaft through a hollow sun gear 110. Further, when the electric drive unit is coupled to a gearbox, the motor input assembly may be located at any desired location in the power path rather than constrained to an end as in a single motor non-through shaft electric drive layout. Additionally, the gearbox may be a multi-speed gearbox, with gear changes to further extend the ratio range of the electric drive. Still further in such an example, a power take-off (PTO) 176 may be incorporated into either output of the electric drive unit.

Further, in the electric drive unit 106, the PTO 176 may be rotationally coupled to the ring gear 112 via one or more shaft(s), gear(s), and the like, in one example. A PTO clutch 178 may be provided in a PTO assembly 179. The PTO clutch 178 functions to disconnect the ring gear 112 from the PTO. For stationary PTO operation (i.e., when the vehicle is stationary and has a null speed), the PTO clutch 178 may be engaged while clutch 170 is in a neutral position. Alternatively, the PTO 176 may be engaged while vehicle is in motion and therefore shares driving torque with ring gear 112. In another mode, PTO 176 may be engaged through ring gear 112 to drive an accessory load while drive torque is provided through sun gear 110. Although coupling the PTO 178 with the ring gear 112 may be desirable with regard to PTO loads as the low-speed output of the planetary assembly 106, the previously described PTO 176 and PTO clutch 178 may alternatively be coupled to the sun gear 110 to drive high speed accessory loads and may be operated in any of the three previously described modes, either stationary, load sharing through the sun device 110, or drive torque through the ring device 116 and accessory load through the sun device 110.

In another example, the electric drive unit 106 may be connected to multiple drive axles (e.g., a front drive axle and a rear drive axle) in a four-wheel drive powertrain (e.g., all-wheel drive powertrain). In such an example, the electric drive unit 106 has a second output 182 which is connected to the sun gear 110 and one drive axle 184. In this example, the first output 172 is connected to another drive axle. Therefore, in such an example, the downstream component 174 represents another drive axle. In this way, the powertrain is able to achieve a fixed front-to-rear torque split utilizing both outputs from the planetary assembly. In this example, a clutch may be provided at one or both of the outputs to allow at least one of the drive axles to be disconnected for two-wheel drive operation. Additionally, in the all-wheel drive powertrain example, the electric drive unit 106 may be center mounted in the vehicle. The PTO 176 may be used in conjunction with this all-wheel drive architecture.

In one example, since the pitch line velocities of the ring gear 112, the sun gear 110, and the pinion gears 116 may be equal, the pinion gears may have different sizes with different tooth counts such that the sun gear and the ring gear centers have an offset (e.g., eccentricity). An eccentric planetary architecture allows the drive unit's packing options to be expanded by allowing for different output shaft offsets. Still further, in another example, a pinion gear tooth count may be selected that allows for unequal arc length spacing of the pinion gears in relation to arrangement about the interior of the ring gear.

It will be understood that in the illustrated example, the ring gear 112 and the sun gear 110 will spin in opposite directions in relation to one another. As such, a shift between using the ring gear and the sun gear as the output may utilize an electric synchronization technique where the shift is accomplished with a change of direction for the input motor. For instance, during a shift event, the clutch 170 may be brought to a neutral position, the electric machines 118 may be controlled to bring the speed of the ring gear and the sun gear to zero. The electric machines 118 reverse direction and then the new mating output (ring gear or sun gear) may be brought within a target speed variance of the output (172 or 182, respectively) and then clutch 170 is engaged with its respective output (172 or 182).

Figure 1C:
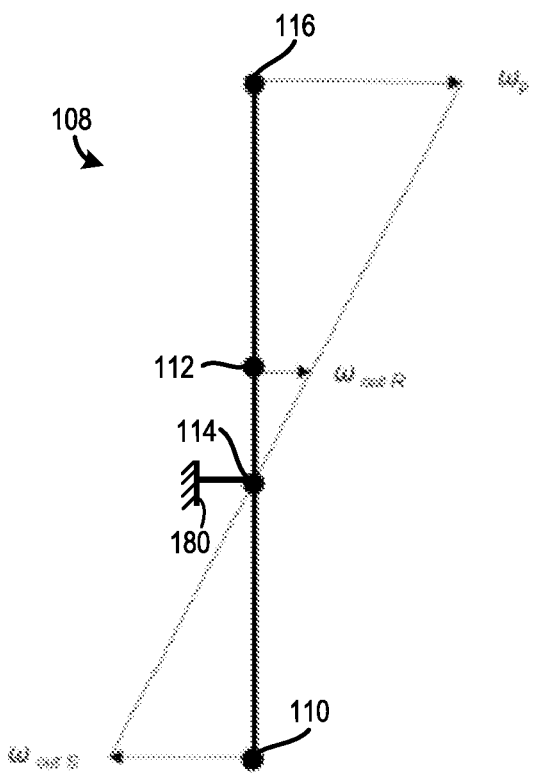

FIG. 1C shows a drive speed lever diagram for the planetary gear set 108 which is included in the electric drive unit 106 depicted in FIG. 1A. As depicted in FIG. 1C, the pinion gears 116 are rotationally coupled to the ring gear 112 which is rotationally coupled to the sun gear 110. Further, in the illustrated example, the carrier 114 is fixed to component 180 and the ring gear 112 and the sun gear 110 are potential output locations.

Equations (3) and (4) which denote the correspondence between the planetary assembly's ring to planet ratio, the output's angular speed, and the input's angular speed when the ring gear and the sun gear are used as an output, respectively, are provided below.

$$\frac{\omega_R}{\omega_P} = \frac{1}{e_P} \quad (3)$$

$$\frac{\omega_S}{\omega_P} = -\frac{e_1}{e_P} \quad (4)$$

Parameters $\omega_s$: Angular speed, sun $\omega_R$: Angular speed, ring $e_P$: ring to pinion ratio $e_1$: ring to sun ratio FIG. 2A shows an example of an electric drive unit 200 with a compound planetary gear set 202. The compound planetary gear set 202 again includes a carrier 204 which is grounded as well as a ring gear 206 and a sun gear 208 which can both function as the output. Additionally, the compound planetary gear set 202 includes a first set of pinion gears 210 that meshes with a second set of pinion gears 212. The carrier 204 is coupled to the first and second sets of pinion gears 210 and 212. The first set of pinion gears 210 meshes with the ring gear 206 and the second set of pinion gears 212 meshes with the sun gear 208, in the illustrated example. In other examples, the pinion gears 212 may be referred to as a first set of pinion gears and the pinion gears 210 may be referred to as a second set of pinion gears, depending on the order in which they are descriptively introduced. The numbering of the set of electric machines may be similarly reversed based on the order in which they are introduced.

The first set of pinion gears 210 rotate in an opposite direction as the second set of pinion gears 212. Thus, using two sets of pinion gears reverses the rotational direction and the sun gear 208, the ring gear 206, and the first set of pinion gears 210 therefore rotate in the same direction. As such electronic synchronization of the sun gear and the ring gear can be accomplished without a change of direction for the electric machines 218 when the electric drive unit 200 is configured as a multi-speed drive unit with a clutch 214 that is designed to switch the output of the compound planetary gear set 202 between the ring gear 206 and the sun gear 208.

To provide clearance between the sets of pinion gears and the non-mating gear teeth, equation (5) may be used to determine the maximum size of the pinion gears, in one example. Gear teeth are specifically used as the measure of gear size in equation (5). However, it will be appreciated that the gear size may be expressed in terms of radius, diameter, etc., in other examples.

$$P_{max} = \frac{R-S}{2} - 1 \quad (5)$$

Parameters $P_{max}$: maximum pinion gear teeth $R$: ring gear teeth $S$: sun gear teeth FIG. 2A further shows a set of electric machines 216 with individual electric machines 218, 220, 222, and 224. It will be understood that the electric machines may be conceptually divided into sub-sets as elaborated upon herein with regard to FIGS. 5B-5C.

In one example, each of the electric machines 218, 220, 222, and 224 may have a similar axial separation between the machine and the corresponding pinion device. Therefore, in such an example the sizing of the housing may be constrained by the equation (6), in one specific example.

$$r_{motor\ max} = \sin\left(\frac{\pi}{N_P}\right) * (r_{ring} - r_P) \quad (6)$$

Parameters $r_{motor\ max}$:Maximum motor radius $r_{ring}$:ring gear radius $r_P$:pinion gear radius $N_P$:number of pinion gears However, in another example, the electric machines may be positioned at varying axial distances from the associated pinion gear to allow for larger radius electric machine to be packaged in the electric drive unit. Further, in another example, gear reductions may be used to attach the electric machines to the pinion devices which may however increase the unit's overall size and complexity.

Figure 2B:
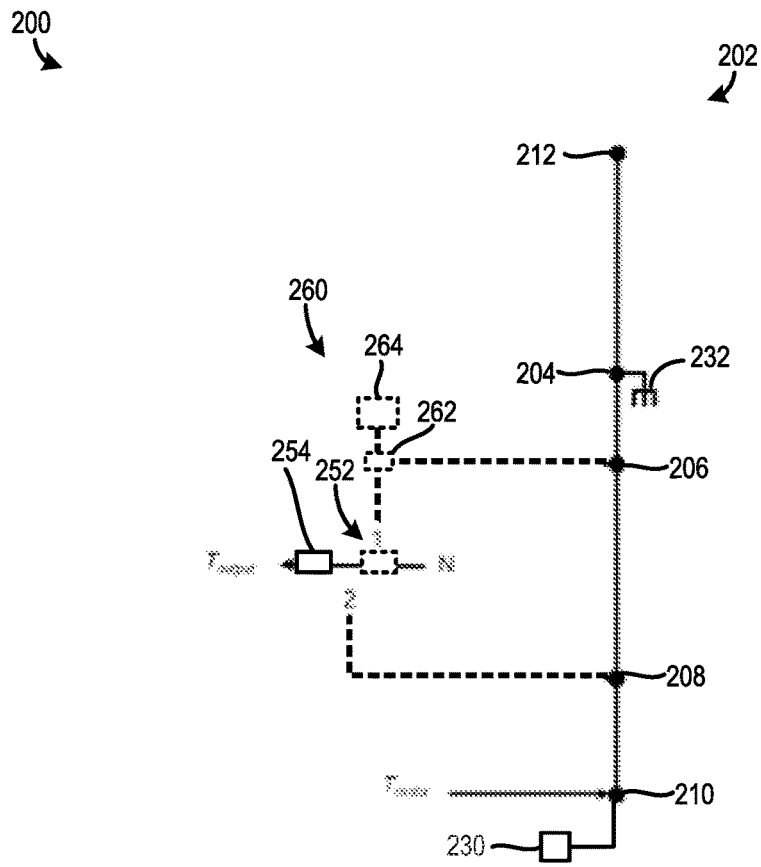
FIGS. 2B-2C are lever diagrams of the electric drive unit and the compound planetary assembly, depicted in FIG. 2A.

FIG. 2B shows a drive torque lever diagram for the electric drive unit 200 with the planetary assembly 202. A set of electric machines 230 are shown providing input to the first set of pinion gears 210. The first set of pinion gears 210 are rotationally coupled to the ring gear 206 which is rotationally coupled to the sun gear 208. Further, in the illustrated example, the carrier 204 is fixed to a component 232 and the ring gear 206 and the sun gear 208 are potential output locations. The second set of pinion gears 212 are further shown in FIG. 2B. Equations (7) and (8) which denote the correspondence between the planetary assembly's ring to planet ratio, the input torque, and the output torque when the ring gear and the sun gear are used as the output, respectively, are provided below.

$$\frac{T_{outR}}{T_{in}} = e_{P1} \quad (7)$$

$$\frac{T_{outS}}{T_{in}} = \frac{e_{P1}}{e_1} \quad (8)$$

Parameters $T_{outR}$:Output Torque, ring $T_{outS}$:Output Torque, sun $e_{P1}$:ring to first pinion ratio $e_1$:ring to sun ratio For equations (7) and (8), the first set of pinion gears 210 is used as the input and the ring gear to pinion gear ratios are assumed to be identical. In such an example, an identical equation may be used when the second set of pinion gears 212 is utilized as the motor input. However, the ring gear to pinion gear ratios may vary, in alternate examples.

FIG. 2B again shows an optional clutch 252 (e.g., a sliding clutch mechanism) which may be included in the electric drive unit 200. The clutch 252 is configured to selectively engage the ring gear 206 or the sun gear 208 with the output 254 for the compound planetary gear set 202. As such, the clutch 252 is shiftable between a first gear where the ring gear is the output and a second gear where the sun gear is the output. The clutch 252 may also have a neutral position where neither the ring gear nor the sun gear is engaged. In this way, the electric drive unit's gear ratio is able to be altered which allows the electric machines to be more efficiently operated, thereby increasing vehicle efficiency and range.

The output 254 may connect to another planetary assembly for a coaxial power-path or a transfer gear for a multi-axis layout. More generally, the output 254 may again be coupled to a downstream powertrain component such as a drive wheel, a drive axle, or a gearbox (e.g., multi-speed gearbox). Consequently, the electric drive unit's applicability is expanded to a variety of vehicle platforms, thereby increasing customer appeal.

The electric drive unit 200 may further include a PTO assembly 260 which may include a PTO 262 and a PTO clutch 264. The PTO 262 is coupled to the ring gear 206, in the illustrated example. However, alternatively, the PTO 262 may be coupled to the sun gear 208. The PTO assembly 260 may exhibit similar functionality to the PTO assembly 179 discussed above with regard to FIG. 1B. Therefore, redundant description is omitted for brevity.

Figure 2C:
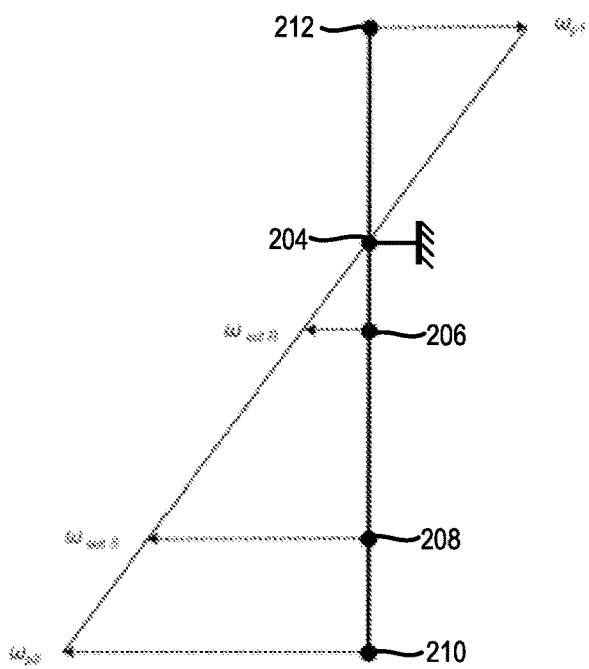

FIG. 2C shows a drive speed lever diagram for the compound planetary gear set 202. Again, the first set of pinion gears 210 are rotationally coupled to the ring gear 206 and the second set of pinion gears 212 which is rotationally coupled to the sun gear 208. Further, in the illustrated example, the carrier 204 is fixed and the ring gear 206 and the sun gear 208 are potential output locations.

Equations (9) and (10) which denote the correspondence between the planetary assembly's ring to planet ratio, the output's angular speed, and the input's angular speed when the ring gear and the sun gear are used as an output, respectively, are provided below.

$$\frac{\omega_R}{\omega_P} = \frac{1}{e_{P1}}$$

$$\frac{\omega_S}{\omega_P} = \frac{e_1}{e_{P1}}$$

Parameters $\omega_s$:Angular speed, sun $\omega_R$:Angular speed, ring $e_P$:ring to pinion ratio $e_1$:ring to sun ratio For equations (7)-(10), the ring gear to pinion gear ratios are assumed to be identical. However, the ring gear to pinion gear ratios may vary, in alternate examples.

FIG. 3 shows another example of a planetary gear set 300 which may be included in an electric drive unit. The planetary gear set 300 again includes a ring gear 302, a sun gear 304, and a carrier 306 which is mechanically grounded. The planetary gear set 300 further includes a first set of pinion gears 308 and a second set of pinion gears 310. In the exemplary layout shown in FIG. 3 both of the sets of pinion gears 308 and 310 mesh with both the ring gear 302 and the sun gear 304. However, the sets of pinion gears 308 and 310 do not mesh with one another, in the illustrated example. The different sets of pinion gears may be independently driven by different inverter componentry as discussed in more detail below in relation to FIGS. 5A-5C.

FIG. 4 shows yet another example of a planetary gear set 400. The planetary gear set 400 is a simple planetary gear set which solely includes the ring gear 402, the pinion gears 404, the carrier 406 which is fixed, and the sun gear 408, in the illustrated example. Specifically, as illustrated in FIG. 4, the planetary gear set 400 may include 28 pinion gears, which may be a maximum number of pinion gears which can be included in the gear set, in some instances. The maximum number of pinion gears may be in part a function of the specific planetary gear set ratio selected and a constraint on minimum ring to sun ratio (e.g., 1.25 in one use-case example) due to manufacturability reasons. Specifically, in one example, the maximum number of pinion gears may be derived from a geometry proof and a condition that constrains the planetary ratio to a minimum value (e.g., 1.25) for manufacturability reasons. Conversely, the minimum number of pinion gears in the planetary gear sets described herein may be three, in one example. In certain practical applications, the planetary gear set may be in the range of 3-6 pinion gears to achieve desired packaging goals or constraints of certain vehicle platforms. To elaborate, the maximum number of pinion gears and motors correspondingly may be 6, in one example. In this way, the electric drive unit is able to achieve packaging and expense targets for certain vehicles.

Figure 5A:
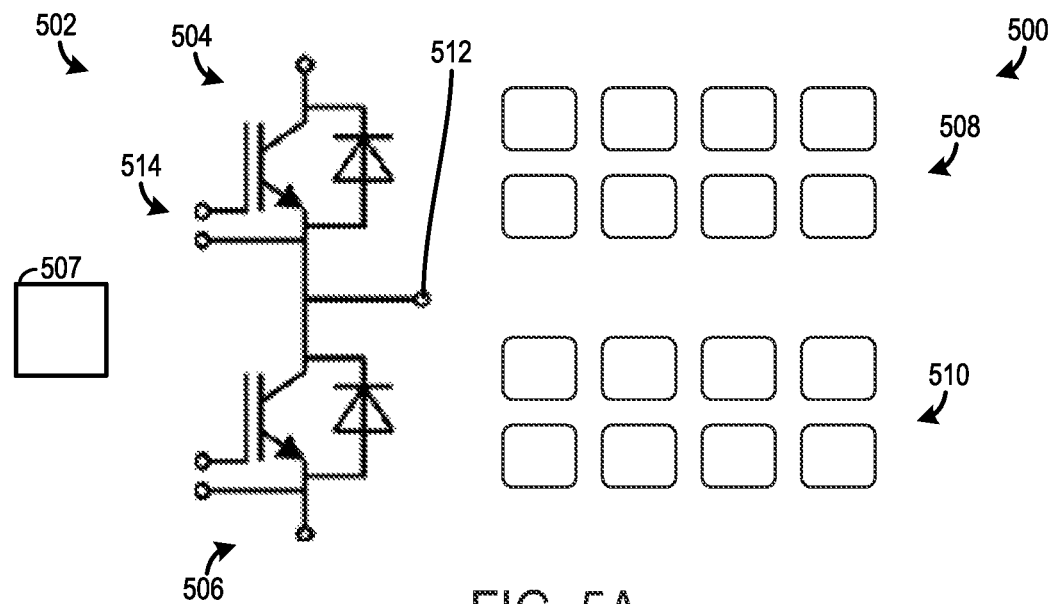
FIGS. 5A-5C are different examples of inverter assembly layouts.
Figure 5B:
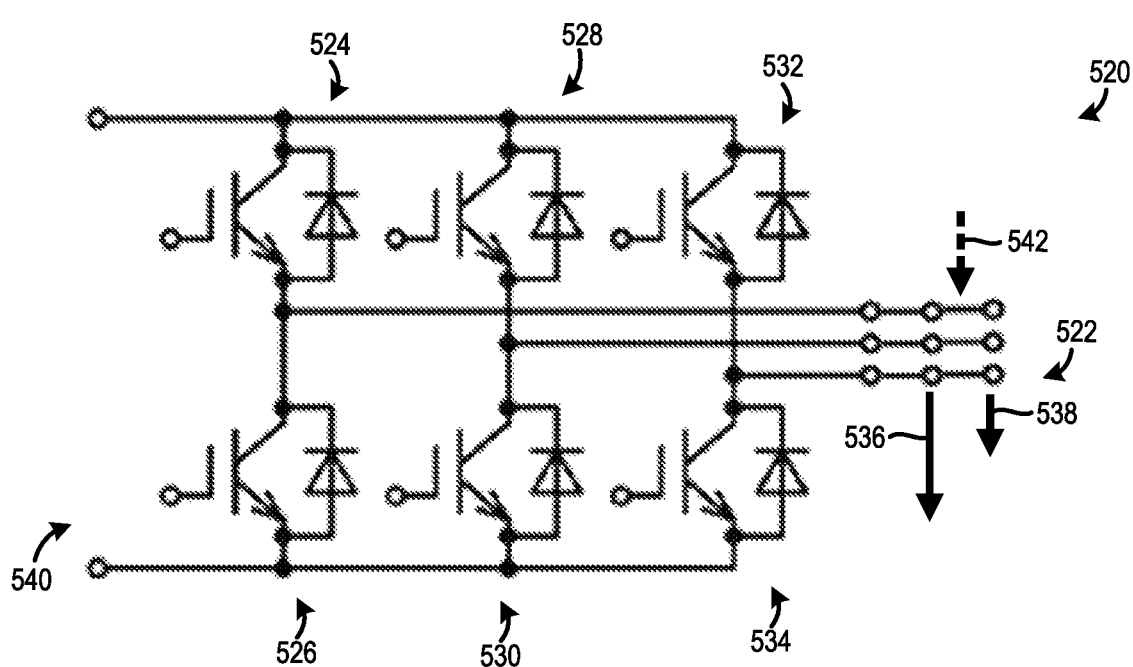
Figure 5C:
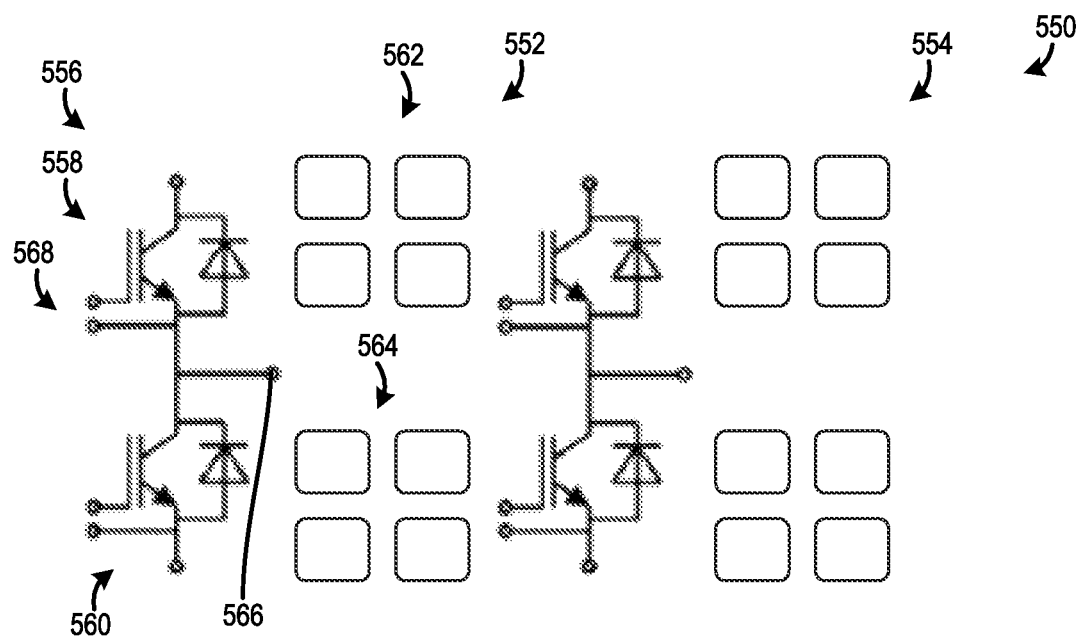

The electric machines depicted in FIGS. 1A, 1B, 2A, and 2B as well as electric machines which may be coupled to planetary gear sets depicted in FIGS. 3 and 4 may receive electrical energy from inverter assemblies also referred to as power electronics. It will be appreciated that the inverter assemblies may be conceptually included in the electric drive units, in one example. However, in other examples, the inverter assemblies may be separate from the drive units. More generally, the inverters may be included in the electric drive systems. Additionally, the inverter assemblies may be collocated with the electric machines and the planetary assembly, in some cases. Alternatively, the inverter assemblies may be spaced away from the electric machines and/or planetary assemblies. Wiring and/or bus bars may be used to connect the inverters and the electric machines. FIGS. 5A-5C show different inverter assembly layouts that may be used in conjunction with any of the electric machines and electric drive units, more generally, described herein.

Turning specifically to FIG. 5A, an inverter assembly 500 is illustrated where one inverter assembly drives each electric machine in parallel. As discussed above the electric machine may be three-phase machines and the inverter assembly 500 and the other inverter assemblies described herein may be three-phase inverters. However, the inverter assembly architecture shown in FIG. 5A corresponds to one phase in the electric machine. It will be understood that the inverter circuitry for the other phases in the electric machine may be identical to the inverter circuitry shown in FIG. 5A. Further, additional bus bars may be demanded for connecting the inverter assembly to each individual electric machine.

Phase electronics 502 for the single phase in the inverter assembly 500 include an upper switch 504 and a lower switch 506. The phase electronics further include a first set of modules 508 (e.g., power electronic chips) corresponding to the upper switch 504 and a second set of modules 510 corresponding to the lower switch 506.

The upper switch 504 and the lower switch 506 are electronically coupled to an output node 512 which may be electronically coupled to a bus bar in each electric machine in parallel. Input nodes 514 for the upper switch 504 and the lower switch 506 which may be electronically coupled to an energy storage device 507 are further depicted in FIG. 5A. Similarly, energy storage devices may be electrically coupled to the other inverter assemblies described herein.

In the inverter assembly architecture depicted in FIG. 5A, the switch content, the module content, and the total inverter current may be similar to a drive unit with a comparatively large standalone motor. However, additional bus bars may be utilized to connect each individual motor in the electric drive units described herein. The inverter assembly 500 shown in FIG. 5A may be paired with either induction motors or PM motors, in different examples.

FIG. 5B shows an inverter assembly 520 where the single inverter unit drives each electric machine in parallel with electrical contactors 522 that can be selectively decoupled to independently disengage a subset of the electric machines, if desired. To elaborate, FIG. 5B shows an upper switch 524 and a lower switch 526 which correspond to a first phase, an upper switch 528 and a lower switch 530 which correspond to a second phase, and an upper switch 532 and a lower switch 534 which correspond to a third phase.

The contactors 522, in the illustrated example, include a contactor 536 which is electrically connected to one group of electric machines and a contactor 538 which is electrically connected to another group of electric machines. Thus, the contactors 536 and 538 are associated with two different groups of electric machines, respectively. For instance, the electric machines 218 and 222 shown in FIG. 2A may be included in the first group of machines and the electric machines 220 and 224 may be included in the second group of electric machines or vice versa. Input electrical connection nodes 540 for the inverter assembly 520 are further depicted in FIG. 5B. The groups of electric machines may be operated based on load and torque demand. For instance, both groups of electric machines may be operated during high torque and/or load conditions. Conversely, one of the groups of electric machines may be shutdown during low load and/or low torque conditions. Alternatively, a single isolation contactor 542 may be used for one group of electric machines while the other group of electric machines is permanently electrically connected to the inverter (i.e., electrically connected to the inverter without an isolation contactor).

FIG. 5C shows an inverter assembly 550 which is subdivided into multiple sub-assemblies (e.g., a first sub-assembly 552 and a second sub-assembly 554). The first sub-assembly 552 and the second sub-assembly 554 drive different groups of electric machines. For instance, the first sub-assembly 552 may drive a group of electric machines which includes the electric machines 218 and 222 depicted in FIG. 2A while the second sub-assembly 554 may drive a group of electric machines which includes the electric machines 220 and 224 depicted in FIG. 2A or vice versa. Thus, each of the first sub-assembly 552 and the second sub-assembly 554 are able to independently drive the motor groups. Consequently, load sharing operation, at less than peak load may be implemented. For instance, the load between the two motor groups may be balanced when a variance between the motor load is greater than a threshold value. For instance, the motors may be operated to diminish the load variance between the motors, to decrease the chance of motor degradation caused by uneven loading, for example.

The first sub-assembly 552 includes phase electronics 556. The phase electronics 556 for the single phase in the inverter assembly 550 include an upper switch 558 and a lower switch 560. The phase electronics further include a first set of modules 562 (e.g., power electronic chips) corresponding to the upper switch 558 and a second set of modules 564 corresponding the lower switch 560. The upper switch 558 and the lower switch 560 are electronically coupled to an output node 566 which may be electronically coupled to a bus bar in each electric machine in parallel. Input nodes 568 for the upper switch 558 and the lower switch 560 which may be electronically coupled to an energy storage device are further depicted in FIG. 5C. In the illustrated embodiment, the second sub-assembly 554 has a similar configuration to the first sub-assembly 552 and redundant description is omitted for brevity.

When the inverter assembly 550 is divided into sub-assemblies, the switch content and the module content may be greater than a drive unit where a single comparatively large motor is utilized. However, the total inverter current for the inverter which is divided into sub-assemblies may be similar to the current used in an electric drive unit that uses a single comparatively large motor. The inverter assembly 550 may demand additional bus bars to allow for the inverter to electrically connect to each individual motor.

The inverter assemblies 520 and 550 shown in FIGS. 5B and 5C may be paired with induction motors, in one example. When induction motors are used in the drive unit, a limp home mode may be deployed. To expound, the limp home mode may be triggered when one or more motors in one of the sets of motors becomes degraded (e.g., non-operational). In such an example, the motor set with the non-operational motor may be shut-down while the other set of motors may be sustained in drive operation. Therefore, when induction motors are used in the drive unit, back electromotive force (EMF) may be avoided in the motors which are shutdown thereby decreasing the chance of motor degradation caused by the back EMF. In this way, the vehicle is capable of being driven even when one or more of the motors is non-operational, thereby expanding the drive unit's capabilities.

The electric drive units described herein achieve efficiency gains when a common inverter, as shown in FIGS. 5A-5C, is used to drive in parallel all of the motors. Further, the use of parallel switching devices, in the inverter architecture shown in FIGS. 5B-5C, enables independent motor control, to expand the drive unit control capabilities and increase drive unit efficiency by shutting down a selected group of motors during low load or torque conditions.

The compound planetary gear sets described herein may be configured such that the two sets of pinion gears have asymmetric ratios. Both sets of pinion gears may be used as motor inputs in combination with a sub-divided inverter, such as the inverter assembly 550 shown in FIG. 5C and discussed above. Both motor groups may be operational during higher load and higher torque conditions. The numerically lower ratio motor group may be solely operation (while the higher ratio motor group is non-operational) for lower load conditions or with an increased efficiency control scheme where the motor group or combination of motor group loading provides a lower (e.g., the lowest) partial load energy consumption result.

Expense considerations may be taken into account when designing the electric drive unit, in certain cases. For instance, induction motors may be less expensive than PM motors, in some instances. Further, the inverter for the induction motor embodiment may demand more current when compared to the PM motor embodiment. Further, utilizing a segmented inverter assembly, such as the inverter assembly depicted in FIG. 5C, may be more expensive than non-segmented inverters.

It will be appreciated that electric drive systems may be formed out of combinations of the different inverter assemblies and electric drive units which are described herein. As such, different combinations of the electric drive units shown in both FIGS. 1A-1C, 2A-2C, 3, and 4 as well as the inverter assemblies shown in FIGS. 5A-5C have been envisioned.

Figure 6:
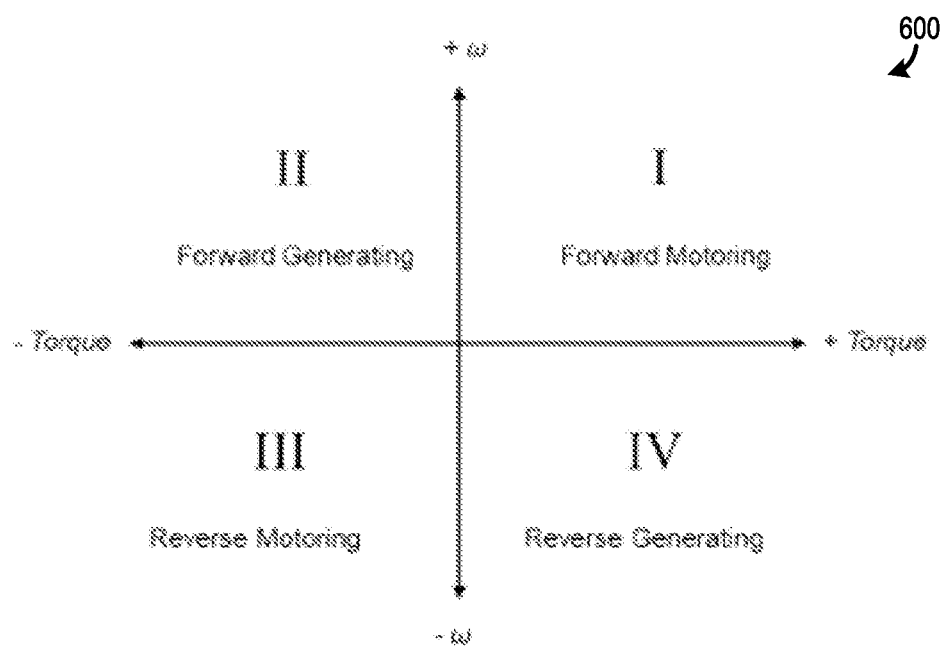
FIG. 6 is an exemplary electric machine map.

FIG. 6 shows a four-quadrant electric machine map 600 that may be used as a control strategy for the electric drive unit 200 shown in FIGS. 2A-2C or other drive units which includes a compound planetary gear set with two sets of pinions and two sets of electric machines. In the map 600 depicted in FIG. 6, torque is expressed on the abscissa (increasing from left to right in the frame of reference depicted in FIG. 6) and motor angular speed ($\omega_s$) is expressed on the ordinate (increasing from bottom to top in the frame of reference depicted in FIG. 6). The graph is conceptually divided into four quadrants (I-IV). The first quadrant (I) corresponds to a forward motoring mode for the group of motors operating in that quadrant. The second quadrant (II) corresponds to a forward generating operating mode for the group of motors operating in that quadrant. The third quadrant (III) corresponds to a reverse motoring operating mode for the group of motors operating in that quadrant. The fourth quadrant (IV) corresponds to a reverse generating operating mode for the group of motors operating in that quadrant.

As shown in FIG. 6, in the compound planetary gear sets, due to the opposite speed signs of the pinion gears, powering both sets of pinion gears may demand that the individual motor groups operate in alternate quadrants on the four-quadrant electric machine map 600. For example, the motor groups may be operated in quadrants I and III to motor together or quadrants II and IV to generate together. By convention, speed and torque with the same sign indicates motoring while opposite signs indicate generating. In FIG. 6, forward and reverse directions refer to the motor speed domain.

Power recirculation may additionally be implemented in the electric drive unit which utilizes a compound planetary gear set. For instance, in one power recirculation mode the sets of electric machines may be operated in quadrant I and IV, respectively. In another power recirculation mode, the sets of electric machines may be operated in quadrants II and III, respectively. In this way, drive unit braking performance is increased in specific circumstances where battery power or temperature constraints prevent charging of the battery while a negative net electric braking torque is still achieved. It will be appreciated that this power recirculation control scheme (which is expanded upon herein with regard to FIG. 7) may be specifically be used in electric drive units with groups of independently controllable electric machines. As such, the power recirculation control scheme may be used in conjunction with either of the inverter assemblies shown in FIGS. 5B and 5C and corresponding electric machine and planetary assemblies.

Figure 7:
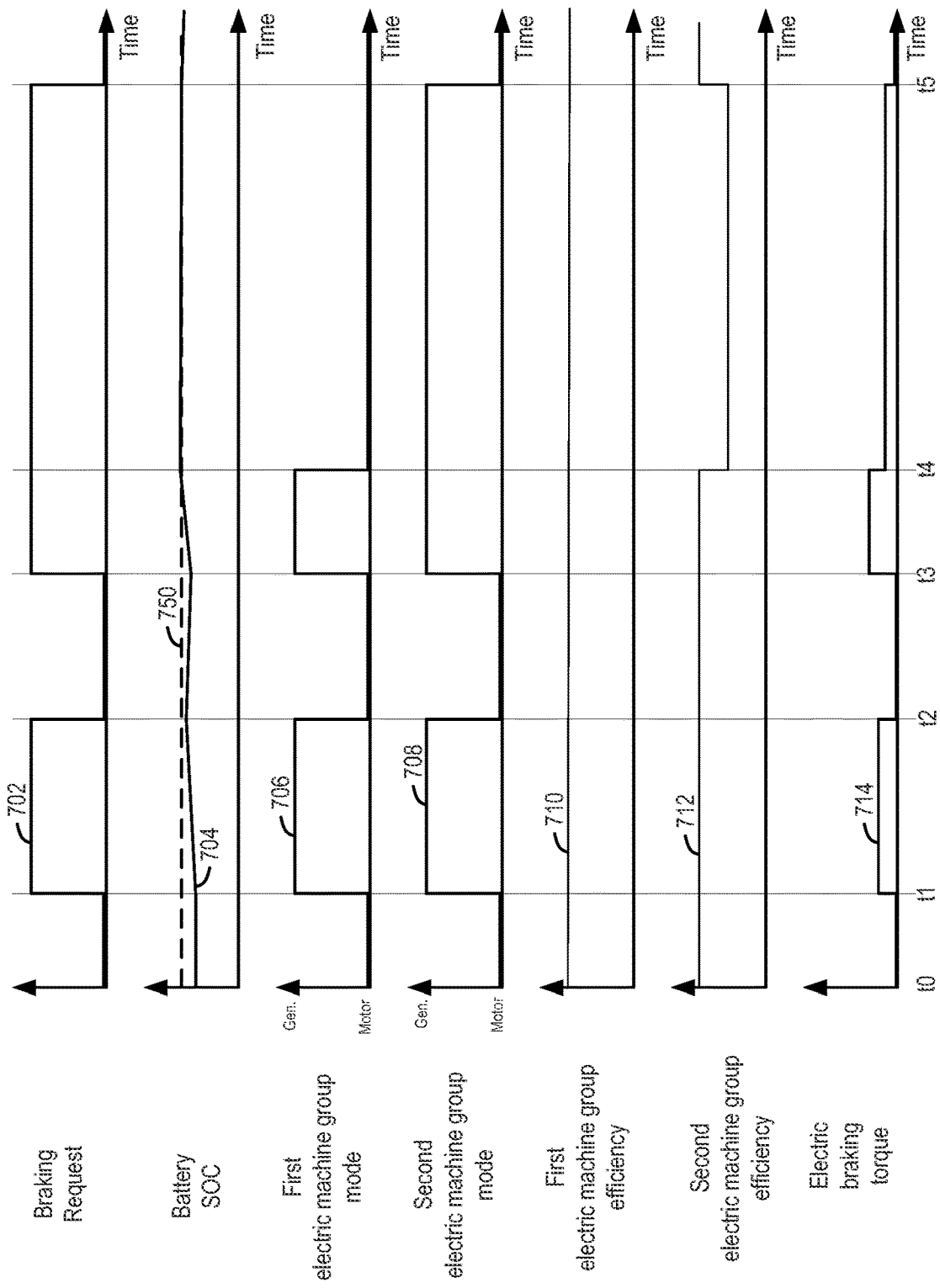
FIG. 7 is an example electric drive unit operating sequence according to an exemplary power recirculation control scheme.

Referring now to FIG. 7, an example vehicle operating sequence is shown. The sequence of FIG. 7 may be provided via the electric drive units of FIGS. 2A-2C and the corresponding inverter assemblies (e.g., the inverter assemblies shown in FIGS. 5B and 5C). The plots shown in FIG. 7 are time aligned and they occur at a same time. The vertical lines at times t0-t5 represent times of interest in the sequence.

The first plot from the top of FIG. 7 is a plot of a vehicle braking request state versus time. The vertical axis represents the vehicle braking state and vehicle braking is requested when trace 702 is at a level that is near the vertical axis arrow. Vehicle braking is not being requested when trace 702 is at a level that is near the horizontal axis. The horizontal axis represents time and time increases from the left side of the plot to the right side of the plot. Trace 702 represents the vehicle braking state. A vehicle braking request may be initiated via applying a brake pedal or via an autonomous driver.

The second plot from the top of FIG. 7 is a plot of a battery state of charge versus time. The vertical axis represents battery state of charge (SOC) and the battery state of charge increases in the direction of the vertical axis arrow. The battery state of charge is zero at the level of the horizontal axis. The horizontal axis represents time and time increases from the left side of the plot to the right side of the plot. Trace 704 represents the battery state of charge level. Horizontal line 750 represents a threshold level that the battery state of charge may exceed.

The third plot from the top of FIG. 7 is a plot that indicates an operating mode of a first electric machine group of a vehicle versus time. The first electric machine group may be operated in a generator mode where the first electric machine group generates electric power and delivers the electric power to a power bus. The first electric machine group may also be operated in a motor mode where the first electric machine group generates mechanical power to propel a vehicle. The first electric machine group may operate in the generator mode when trace 706 is at a higher level that is near the vertical axis arrow. The first electric machine group may operate in a motor mode when trace 706 it at a lower level that is near the horizontal axis. The horizontal axis represents time and time increases from the left side of the plot to the right side of the plot. Trace 706 represents the operating mode of the first electric machine group. In this example, the first electric machine group may be coupled to a first set of pinion gears in a compound planetary gear set.

The fourth plot from the top of FIG. 7 is a plot that indicates an operating mode of a second electric machine group of a vehicle versus time. The second electric machine group may be operated in a generator mode where the second electric machine group generates electric power and delivers the electric power to a power bus. The second electric machine group may also be operated in a motor mode where the second electric machine group generates mechanical power to propel a vehicle. The second electric machine group may operate in the generator mode when trace 708 is at a higher level that is near the vertical axis arrow. The second electric machine group may operate in a motor mode when trace 708 it at a lower level that is near the horizontal axis. The horizontal axis represents time and time increases from the left side of the plot to the right side of the plot. Trace 708 represents the operating mode of the second electric machine group. In this example, the second electric machine group may be coupled to a second set of pinion gears in the compound planetary gear set.

The fifth plot from the top of FIG. 7 is a plot that indicates an operating efficiency of the first electric machine group of a vehicle versus time. The first electric machine group operating efficiency may be adjusted via changing a speed of the first electric machine group via the compound planetary gear set. In addition, the operating efficiency of the first electric machine group may be adjusted via adjusting output of an inverter that is electrically coupled to the first electric machine group. The vertical axis represents the operating efficiency of the first electric machine group whether the first electric machine group is operating in a motor or generator mode. The horizontal axis represents time and time increases from the left side of the plot to the right side of the plot. Trace 710 represents the operating efficiency of the first electric machine group.

The sixth plot from the top of FIG. 7 is a plot that indicates an operating efficiency of the second electric machine group of a vehicle versus time. The second electric machine group operating efficiency may be adjusted via changing a speed of the second electric machine group via the compound planetary gear set. In addition, the operating efficiency of the second electric machine group may be adjusted via adjusting output of an inverter assembly that is electrically coupled to the second electric machine group. The vertical axis represents the operating efficiency of the second electric machine group whether the second electric machine group is operating in a motor or generator mode. The horizontal axis represents time and time increases from the left side of the plot to the right side of the plot. Trace 712 represents the operating efficiency of the second electric machine group.

The seventh plot from the top of FIG. 7 is a plot of electric braking torque (e.g., braking torque that is provided by electric machines) versus time. The vertical axis represents an amount of braking torque and the amount of braking torque increases in the direction of the vertical axis arrow. The horizontal axis represents time and time increases from the left side of the plot to the right side of the plot. Trace 714 represents the amount of electric braking torque.

At time t0, vehicle braking is not requested and the battery SOC is less than threshold 750. The first and second electric machine groups are operating in motor mode so as to provide torque to propel the vehicle. The operating efficiency of the first and second electric machine groups is at a high level and the vehicle braking torque is zero.

At time t1, vehicle braking is requested. The SOC is low so the first electric machine group and the second electric machine group are operated in a generator mode so as to increase the battery SOC and provide a braking torque to slow the vehicle. The first and second electric machine groups continue to operate at a high efficiency and the electric braking torque is a low level braking torque.

At time t2, the vehicle braking request is withdrawn and the battery SOC begins to be reduced. The first electric machine group and the second electric machine group are operated in a motor mode. The efficiency of the first and second electric machine groups remains at a higher level. The electric braking torque is reduced to zero.

At time t3, vehicle braking is requested a second time in the sequence. The battery SOC is below threshold 750 so the first electric machine group and the second electric machine are both operated in generator mode to charge the battery. The efficiency of the first and second electric machine groups is at a high level and the braking torque is a middle level.

At time t4, the vehicle braking request remains asserted and the battery SOC reaches the level of threshold 750. Therefore, the first electric machine group switches to operating in motor mode and the second electric machine group remains operating in generator mode. The efficiency of the first electric machine group is maintained and the efficiency of the second electric machine group is reduced. In this example, the overall braking torque level is decreased, but electric braking continues to be provided. The requested braking torque amount may be provided via a combination of electric braking and by applying the friction foundation brakes.

At time t5, the vehicle braking request is withdrawn and the first and second electric machine groups both operate in motor mode. The battery SOC is high and the efficiency of the first and second electric machine groups is at a high level. The vehicle braking torque is also reduced to zero.

By operating the first electric machine group in a motor mode and the second electric machine group in generator mode, the first electric machine group may consume all electric power that is generated and output by the second electric machine group so that net power flow to/from the battery is zero so that battery SOC may not increase above a desired level. For example, if the second electric machine group outputs 100 kilowatts, the first electric machine group may consume 100 kilowatts. It should be appreciated that the sequence of FIG. 7 is only one example of how the first and second electric machine groups may be operated. In other examples, the second electric machine group may be operated as a motor and the first electric machine group may be operated as a generator when the battery SOC reaches a threshold level.

FIGS. 1-7 provide for an electric drive unit control strategy where, during a low gear condition, the clutch in the planetary assembly is operated to rotationally couple the ring device to the output of the planetary. Conversely, during a high gear condition, the clutch is operated to rotationally couple the sun device to the output. For instance, the low gear mode may be selected by the vehicle operator or automatically implemented at launch, when the vehicle is experiencing higher load, etc. Conversely, the high gear mode may be selected by the vehicle operator or automatically implemented when the vehicle is traveling at higher speed, experiencing lower loads, etc. The electric drive unit may also operate the clutch to transition between the high and low gear modes based on operating conditions. The electric drive unit may also be operated to synchronize the speed of the ring device and the sun device during a shifting transient to facilitate a smooth gear shift, when the drive unit utilizes a simple planetary gear set. Further, during electric drive unit operation, mechanical power is transferred from the electric machines to the pinions in the planetary gear set. Additionally, when a compound planetary gear set is used in the drive unit, the electric machines may be operated to rotate in opposing directions.

FIGS. 1-7 further provide for a control technique where electrical energy is transferred from the inverter assembly to the electric machines in parallel. Further, in the compound planetary drive unit configuration, the groups of motors may be selectively decoupled from the inverter assembly based on vehicle operating conditions, to conserve energy. For instance, the first or second sets of electric machines may be decoupled from the inverter when the drive unit is experiencing loads which are less than a threshold value.

The planetary assemblies shown in FIGS. 1A, 2A, 3, and 4 are drawn approximately to scale. Further, the electric machines depicted in FIG. 2A are drawn approximately to scale. However, the components may have other relative dimensions, in alternate embodiments.

FIGS. 1A, 2A, 3-4, and 5A-5C show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The invention is further described in the following paragraphs. In one aspect, an electric drive unit is provided that comprises a set of electric machines where each electric machine is coupled to a separate pinion device in a first set of pinion devices of a planetary assembly; and wherein the planetary assembly includes: a carrier that is mechanically grounded; a ring device; and a sun device; wherein the ring device and/or the sun device function as an output; and wherein the first set of pinion devices is rotationally coupled to the ring device and/or the sun device. In one example, the planetary assembly may include a second set of pinion devices that are rotationally coupled to first set of pinion devices. Further, in one example, the first set of pinion devices and the second set of pinion devices may have asymmetric gear ratios. In another example, the electric drive unit may further comprise a clutch configured to rotationally couple: the ring device to the output in a first position; and the sun device to the output in a second position. In another example, the electric drive unit may further comprise a controller including: instructions stored in memory that when executed, during a low gear condition, cause the controller to: operate the clutch to rotationally couple the ring device to the output; and instructions stored in memory that when executed, during a high gear condition, cause the controller to: operate the clutch to rotationally couple the sun device to the output. In another example, the controller includes: instructions stored in the memory that when executed, during a shifting transient, cause the controller to: synchronize a speed of the ring device or the sun device with the output speed. In another example, the sun device or ring device may function as the output and the ring device or the sun device is rotationally coupled to a power take-off (PTO). In another example, the electric drive unit may further comprise a PTO clutch configured to decouple the PTO from the ring device or the sun device. In another example, the ring device may be rotationally coupled to a first drive axle and the sun device is rotationally coupled to a second drive axle. In yet another example, the output may be rotationally coupled to a multi-speed gearbox or additional gearing. In yet another example, the output may be rotationally coupled to a drive wheel. In another example, the planetary assembly may be a: planetary gear set; or planetary traction drive.

In another aspect, a method for operation of an electric drive unit is provided that comprises transferring mechanical power from a set of electric machines to a first set of pinion gears; wherein the electric drive unit comprises: the set of electric machines; and a planetary gear set including: the first set of pinion gears; a carrier that is mechanically grounded; and a ring gear; and a sun gear; and wherein the ring gear and/or the sun gear function as an output; and wherein the first set of pinion gears meshes with the ring gear and/or the sun gear. In one example, the planetary gear set may be a compound planetary gear that includes a second set of pinion gears that mesh with the sun gear and are rotationally coupled to the first set of pinion gears; and the ring gear and the sun gear may rotate in the same direction. In yet another example, the method may further comprise operating a clutch to transition between a lower gear mode where the ring gear is coupled to the output and a higher gear mode where the sun gear is coupled to the output. In another example, the output may be rotationally coupled to: a drive axle; a drive wheel; a multi-speed gearbox; or additional gearing.

In another aspect, an electric drive unit is provided that comprises a set of traction motors that are each rotationally coupled to a separate pinion gear in a first set of pinion gears; and a planetary gear set including: a carrier mechanically grounded and coupled to the first set of pinion gears and a second set of pinion gears; the first set of pinion gears that mesh with a ring gear and/or a sun gear; and the second set of pinion gears that mesh with: a sun gear; and the first set of pinion gears. In one example, the planetary gear set may be multi-speed planetary gear set. In another example, the multi-speed planetary gear set may include a clutch that is configured to selectively couple the sun gear and the ring gear to an output in different gear modes. In another example, the ring gear and/or sun gear may function as an output and are configured to rotationally couple to: a drive axle; a drive wheel; a multi-speed gearbox; or additional gearing.

In another aspect, an electric drive system is provided that comprises a first set of electric machines each of which are rotationally coupled to a pinion device in a first set of pinion devices; a planetary assembly including: the first set of pinion devices; a carrier which is mechanically grounded; a ring device; and a sun device; and an inverter assembly electrically coupled to the first set of electric machines in parallel; wherein the first set of pinions is rotationally coupled to the ring device and/or the sun device. In another example, the planetary assembly may include a second set of pinion devices that are rotationally coupled to the ring device or the sun device; and the second set of pinion devices may be rotationally coupled to a second set of electric machines. In another example, the inverter assembly may further comprise: a first set of electrical contactors configured to independently selectively electrically decouple the inverter assembly from the first set of electric machines; and a second set of electrical contactors configured to independently selectively electrically decouple the inverter assembly from the second set of electric machines. In another example, the inverter assembly may further comprise: a first sub-assembly configured to independently electrically drive the first set of electric machines; and a second sub-assembly configured to independently electrically drive the second set of electric machines. In another example, each of the electric machines in the first set of electric machines and the second set of electric machines may be permanent magnet motors. In another example, the first set of pinion devices and the second set of pinion devices may have asymmetric ratios. In yet another example, the electric drive system may further comprise a controller including: instructions stored in memory that when executed, during a drive condition, cause the controller to: operate the first set of electric machines to rotate in a first direction; and operate the second set of electric machines to rotate in a second direction that is opposite the first direction. In another example, the electric drive system may further comprise a speed sensor configured to determine an operating speed of all of the electric machines in the first set of electric machines. In another example, the electric machines in the first set of electric machines may be permanent magnet motors or induction motors. In another example, the planetary assembly may be a: planetary gear set; or planetary traction drive.

In yet another aspect, a method for operation of an electric drive system is provided that comprises transferring electrical energy from an inverter assembly to a first set of electric machines in parallel; wherein the electric drive system includes: the first set of electric machines each of which are rotationally coupled to a pinion device in a first set of pinion devices; and a planetary assembly including: the first set of pinion devices; a carrier which is mechanically grounded; and a ring device; and a sun device; and the inverter assembly; wherein the first set of pinion device is rotationally coupled to the ring device and/or the sun device. In another example, the electric drive system may further comprise a second set of electric machines that are electrically coupled to the inverter assembly and rotationally coupled to a second set of pinion devices that are rotationally coupled to the ring device or the sun device and the method further comprises transferring electrical energy from the inverter assembly to the second set of electric machines in parallel. In another example, the method may further comprise selectively independently electrically decoupling the first or second sets of electric machines from the inverter assembly based on one or more operating conditions. In yet another example, transferring electrical energy from the inverter assembly to the first set of electric machines in parallel may include independently transferring electrical energy from a first inverter sub-assembly to the first set of electric machines; and transferring electrical energy from the inverter assembly to the second set of electric machines in parallel includes independently transferring electrical energy from a second inverter sub-assembly to the second set of electric machines. In another example, the first and second sets of pinion devices may have asymmetric ratios and the method further comprises driving the first set of electric machines in a first rotational direction and driving the second set of electric machines in a second rotational direction which is opposite the first rotational direction. In another example, the method may further comprise operating the first set of electric machine in a drive mode while operating the second set of electric machines in a regeneration mode, wherein the first and second sets of electric machines have opposite rotational directions.

In another aspect, an electric drive system is provided that comprises a first set of traction motors each of which are rotationally coupled to a pinion gear in a first set of pinion gears; a second set of traction motors each of which are rotationally coupled to a pinion gear in a second set of pinion gears; a planetary gear set including: the first set of pinion gears; the second set of pinion gears; a carrier which is mechanically grounded; and a ring gear; and a sun gear; and an inverter assembly electrically coupled to the first set of traction motors and the second set of traction motors in parallel; wherein the first set of pinion gears meshes with the ring gear and/or the sun gear. In one example, the electric drive system may further comprise a speed sensor coupled to one of the traction motors in the first set of traction motors and configured to determine an operating speed of all of the traction motors in the first set of traction motors. In yet another example, the traction motors in the first and second sets of traction motors may be permanent magnet motors or induction motors. In yet another example, the inverter assembly may further comprise: a first set of electrical contactors configured to independently selectively electrically decouple the inverter assembly from the first set of traction motors; and a second set of electrical contactors configured to independently selectively electrically decouple the inverter assembly from the second set of traction motors; and wherein the electric drive system further comprises a controller including instructions that when executed, while the electric drive system is operating at less than peak load, cause the controller to: implement load sharing between the first set of traction motors and the second set of traction motors.

The control methods and routines disclosed herein may be stored as executable instructions in non-transitory memory and may be carried out by an electric drive unit and/or system that includes the controller in combination with the various sensors and actuators. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the system, where the described actions are carried out by executing the instructions in a system including the various hardware components in combination with the electronic controller. One or more of the method steps described herein may be omitted if desired.

While various embodiments have been described above, it should be understood that they have been presented by way of example, and not limitation nor restriction. It will be appreciated that the configurations and routines disclosed herein are exemplary in nature, and that these specific examples are not to be considered in a limiting sense, because numerous variations are possible. For example, the above technology can be applied to powertrains that include different types of propulsion sources including different types of electric machines, internal combustion engines, and/or transmissions. The technology may be used as a stand-alone, or used in combination with other power transmission systems not limited to machinery and propulsion systems for tandem axles, electric tag axles, P4 axles, HEVs, BEVs, agriculture, marine, motorcycle, recreational vehicles, and on and off highway vehicles, as an example. The subject matter of the present disclosure includes all novel and non-obvious combinations and sub-combinations of the various systems and configurations, and other features, functions, and/or properties disclosed herein. It will be apparent to persons skilled in the relevant arts that the disclosed subject matter may be embodied in other specific forms without departing from the spirit of the subject matter.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

As used herein, the term "approximately" is construed to mean plus or minus one percent of the range, unless otherwise specified.

The invention claimed is:

1. An electric drive system, comprising:
a first set of electric machines each of which are rotationally coupled to a pinion device in a first set of pinion devices;
a second set of electric machines each of which are rotationally coupled to a pinion device in a second set of pinion devices;
a planetary assembly including:
the first set of pinion devices;
the second set of pinion devices;
a carrier which is mechanically grounded;
a ring device; and
a sun device; and
an inverter assembly electrically coupled to the first set of electric machines in parallel;
wherein the first set of pinion devices mesh with or frictionally engage one of the ring device or the sun device; and
wherein the second set of pinion devices mesh with or frictionally engage the sun device or the ring device that is not engaged with the first set of pinion devices.

2. The electric drive system of claim 1, wherein the inverter assembly further comprises:
a first set of electrical contactors configured to independently selectively electrically decouple the inverter assembly from the first set of electric machines; and
a second set of electrical contactors configured to independently selectively electrically decouple the inverter assembly from the second set of electric machines.

3. The electric drive system of claim 1, wherein the inverter assembly further comprises:
a first sub-assembly configured to independently electrically drive the first set of electric machines; and
a second sub-assembly configured to independently electrically drive the second set of electric machines.

4. The electric drive system of claim 1, wherein each of the electric machines in the first set of electric machines and the second set of electric machines are permanent magnet motors.

5. The electric drive system of claim 1, wherein the first set of pinion devices and the second set of pinion devices have unequal diameters.

6. The electric drive system of claim 1, further comprising a controller including:
instructions stored in memory that when executed, during a drive condition, cause the controller to:
operate the first set of electric machines to rotate in a first direction; and
operate the second set of electric machines to rotate in a second direction that is opposite the first direction.

7. The electric drive system of claim 1, further comprising a speed sensor configured to determine an operating speed of all of the electric machines in the first set of electric machines.

8. The electric drive system of claim 7, wherein the electric machines in the first set of electric machines are permanent magnet motors or induction motors.

9. The electric drive system of claim 1, wherein the planetary assembly is a:
planetary gear set; or
planetary traction drive.

10. A method for operation of an electric drive system, comprising:
transferring electrical energy from an inverter assembly to a first set of electric machines in parallel; and
transferring electrical energy from the inverter assembly to a second set of electric machines in parallel;
where the electric drive system includes:
the first set of electric machines each of which are rotationally coupled to a pinion device in a first set of pinion devices;
the second set of electric machines each of which are rotationally coupled to a pinion device in a second set of pinion devices; and
a planetary assembly including:
the first set of pinion devices;
a carrier which is mechanically grounded; and
a ring device; and
a sun device; and
the inverter assembly;
wherein the first set of pinion devices mesh with or frictionally engage one of the ring device or the sun device; and
wherein the second set of pinion devices mesh with or frictionally engage the sun device or the ring device that is not engaged or meshed with the first set of pinion devices.

11. The method of claim 10, further comprising:
selectively independently electrically decoupling the first or second sets of electric machines from the inverter assembly based on one or more operating conditions.

12. The method of claim 10, wherein:
transferring electrical energy from the inverter assembly to the first set of electric machines in parallel includes independently transferring electrical energy from a first inverter sub-assembly to the first set of electric machines; and
transferring electrical energy from the inverter assembly to the second set of electric machines in parallel includes independently transferring electrical energy from a second inverter sub-assembly to the second set of electric machines.

13. The method of claim 10, wherein the first and second sets of pinion devices have unequal diameters and the method further comprises driving the first set of electric machines in a first rotational direction and driving the second set of electric machines in a second rotational direction which is opposite the first rotational direction.

14. The method of claim 10, further comprising operating the first set of electric machine in a drive mode while operating the second set of electric machines in a regeneration mode, wherein the first and second sets of electric machines have opposite rotational directions.

15. An electric drive system, comprising:
a first set of traction motors each of which are each rotationally coupled to a pinion gear in a first set of pinion gears;
a second set of traction motors each of which are each rotationally coupled to a pinion gear in a second set of pinion gears;
a planetary gear set including:
the first set of pinion gears;
the second set of pinion gears;
a carrier which is mechanically grounded; and
a ring gear; and
a sun gear; and
an inverter assembly electrically coupled to the first set of traction motors and the second set of traction motors in parallel;
wherein the first set of pinion gears meshes with the ring gear or the sun gear;
wherein the inverter assembly further comprises:
a first set of electrical contactors configured to independently selectively electrically decouple the inverter assembly from the first set of traction motors; and
a second set of electrical contactors configured to independently selectively electrically decouple the inverter assembly from the second set of traction motors; and
wherein the electric drive system further comprises a controller including instructions that when executed, while the electric drive system is operating at less than peak load, cause the controller to:
implement load sharing between the first set of traction motors and the second set of traction motors.

16. The electric drive system of claim 15, further comprising a speed sensor coupled to one of the traction motors in the first set of traction motors and configured to determine an operating speed of all of the traction motors in the first set of traction motors.

17. The electric drive system of claim 16, wherein the traction motors in the first and second sets of traction motors are permanent magnet motors or induction motors.

* * * * *